Figure 1:
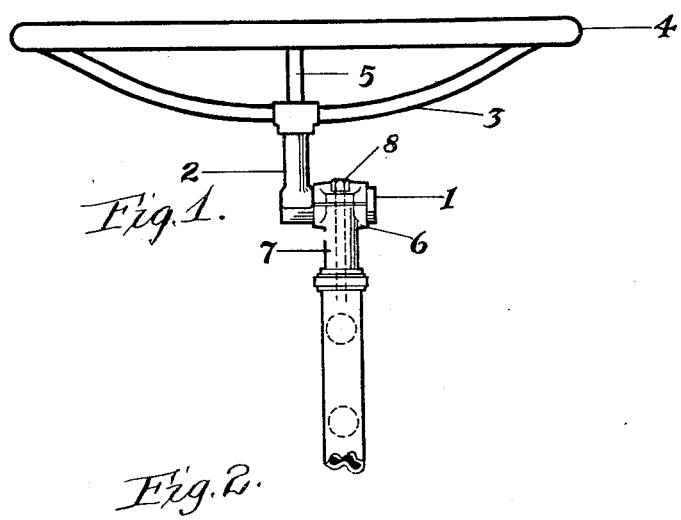

G. G. RUPERT.
BICYCLE ATTACHMENT.
APPLICATION FILED MAR. 23, 1914.

1,130,933.  
Patented Mar. 9, 1915.

UNITED STATES PATENT OFFICE.

GEORGE G. RUPERT, OF DECATUR, ILLINOIS, ASSIGNOR OF ONE-HALF TO WILLIAM T. RUSSELL, OF MACON, ILLINOIS.

BICYCLE ATTACHMENT.

1,130,933.

Specification of Letters Patent. Patented Mar. 9, 1915.

Application filed March 23, 1914. Serial No. 826,468.

*To all whom it may concern:*

Be it known that I, GEORGE G. RUPERT, a citizen of the United States, residing at Decatur, in the county of Macon and State of Illinois, have invented certain new and useful Improvements in Bicycle Attachments, of which the following is a specification.

My invention relates to improvements in bicycle attachments and is particularly directed to the provision of a device adapted to be substituted for the ordinary handle bar, whereby a means for carrying bundles, packages, etc., is provided in connection with a steering arrangement.

A further object is the provision of such a device including an arm or extension adapted to be attached to the ordinary bifurcated sleeve of the steering post and including a receptacle, or package holding member comprising a rim portion and transverse concave members to provide a bottom portion for the device.

Reference is had to the drawing in which is shown a preferred embodiment of my invention, it being understood that changes may be made in practice within the scope of the appended claims without digressing from my inventive idea.

Figure 2:
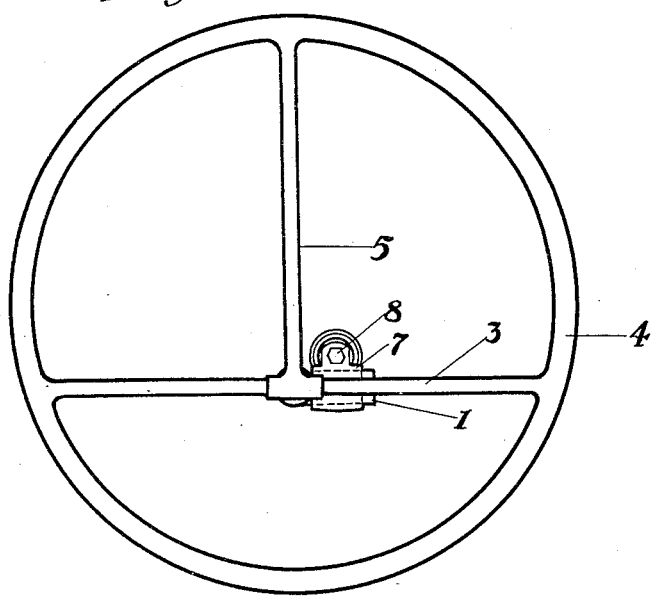

In these drawings, Figure 1 represents an elevation of part of the front part of a bicycle, with my device attached thereto, and Fig. 2 is a top plan view thereof.

In the drawings, the numeral 1 designates the right angled extension or arm of the post member 2 by which the device is mounted on a bicycle. Extending radially from the post member 2 is the transverse and diametric member 3 and the radial member 5, which members extend outwardly to the circular rim member 4. These members 3 and 5 are curved upwardly from their junction with post 2 as shown, so that a sort of a concave receptacle is provided within the rim 4, which is adapted to receive and hold boxes, packages or articles of various kinds, without interfering with the steering of the bicycle, as is well understood.

The right angled extension 1 as stated before, provides the means whereby the device is attached to the bicycle, it being understood that it is merely put in position in the place of the ordinary handle bar, being held by the bifurcated sleeve member 6 on the end of the handle bar post 7, bolt 8, providing the clamping means as is usual in this art.

My device provides a simple and convenient means of carrying bundles and packages of various kinds with safety on the front of a bicycle, motorcycle or similar vehicle, without the liability of interfering with the steering of such a vehicle. It may be readily applied in place and if not desired, may be readily detached.

What I claim is:

1. As an article of manufacture, an attachment for bicycles including a bundle carrying means comprising a circular rim member and downwardly curved radial members, a vertical post member, said radial members being permanently connected to said post member and said post member having a right angled and horizontally extending arm or extension for attachment in place of the usual handle bar.

2. As an article of manufacture, a combined handle bar and bundle carrying means including a circular rim member 4 large enough to receive bundles and having the diametric member 3 and radial member 5 connected together, the post member 2 to which said diametric and radial members are connected at their junction, said post member having a right-angled extension 1 for attachment, said diametric and radial members being curved downwardly as shown to provide the bundle carrier.

In testimony whereof I affix my signature in the presence of two subscribing witnesses.

GEORGE G. RUPERT.

Witnesses:
FRANCES HUDSON,
NORA GRAHAM.

Copies of this patent may be obtained for five cents each, by addressing the "Commissioner of Patents, Washington, D. C."